Nov. 10, 1964     J. P. CRANE     3,156,106
DRILL STRING SHOCK ABSORBERS
Filed Aug. 17, 1962

INVENTOR
Jack P. Crane

ATTORNEYS 3,156,106
DRILL STRING SHOCK ABSORBERS
Jack P. Crane, Odessa, Tex., assignor to Gist Manufacturing Company, Odessa, Tex., a corporation of Texas
Filed Aug. 17, 1962, Ser. No. 217,745
8 Claims. (Cl. 64—27)

This invention relates to new and useful improvements in drill string shock absorbers.

One object of the invention is to provide improved means for absorbing shocks transmitted to a drill string by the engagement of its drill bit with the formation.

Another object of the invention is to provide an improved drill string shock absorber adapted to be mounted adjacent the drill bit without interfering with the transmission of torque and the flow of drilling fluid to said bit.

A further object of the invention is to provide an improved drill string shock absorber having a helically-slotted section for contraction to absorb drill bit shocks and for transmitting torque from the drill string to the drill bit and elastic means for sealing the slotted section against lateral flow and for cushioning the contraction of said section.

A particular object of the invention is to provide an improved drill string shock absorber having a torque-transmitting member in which a plurality of nested helical slots are formed to provide helical shock absorbing portions therebetween, a sleeve of elastic material being disposed within the member to seal the slots thereof and extending into said slots to cushion the contraction of said shock absorbing portions.

A construction designed to carry out the invention will be hereinafter described, together with other features of the invention.

Figure 1:
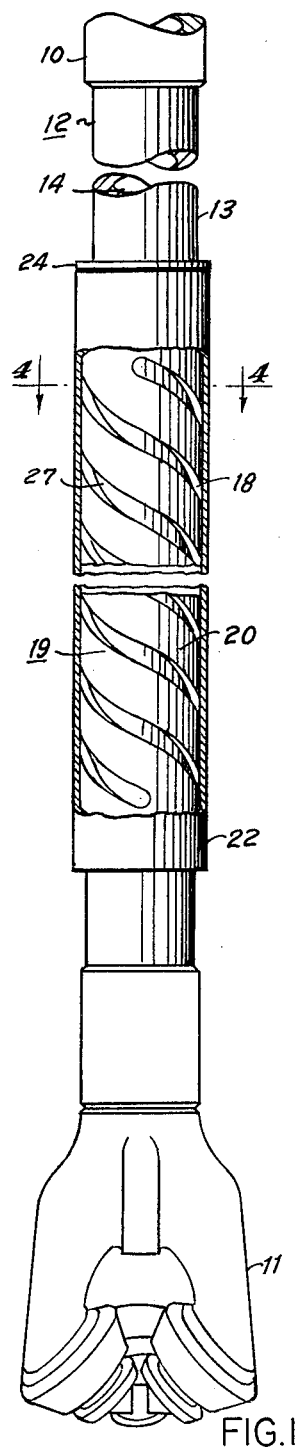
Figure 2:
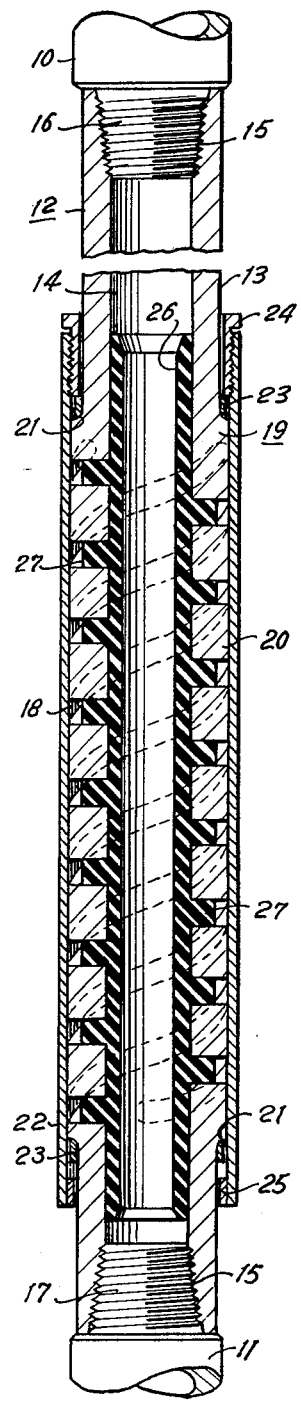
Figure 3:
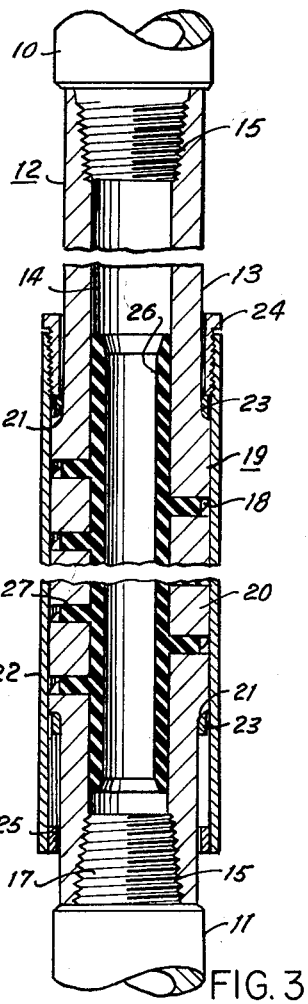
Figure 4:
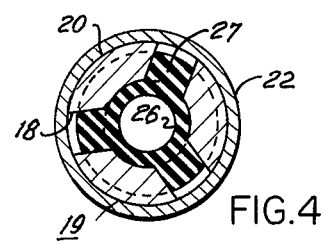

The invention will be more readily understood from a reading of the following specification and by reference to the accompanying drawing, wherein an example of the invention is shown, and wherein:

FIG. 1 is a broken, side elevational view, partly in section, of a shock absorber constructed in accordance with invention mounted in a drill string, FIG. 2 is an enlarged, broken, longitudinal, sectional view of the shock absorber, FIG. 3 is a view, similar to FIG. 2, showing the shock absorber in contracted position, and FIG. 4 is a horizontal, cross-sectional view, taken on the line 4—4 of FIG. 1.

In the drawings, the numeral 10 designates the lower portion of a drill pipe or stem having a drill bit 11 at its lower end. A shock absorber 12, embodying the principles of the invention, is adapted to be interposed between the drill stem 10 and drill bit 11 and includes an elongate, cylindrical body or member 13 having an axial bore 14 extending therethrough. The ends of the bore 14 are screwthreaded to provide boxes 15 for connection with the externally screwthreaded pins 16 and 17 of the drill stem and bit (FIGS. 2 and 3). A plurality of nested, helical openings or slots 18 are formed in the member 13 and extend throughout the major intermediate portion or section 19 thereof. Each slot has a plurality of convolutions. The slots 18 are identical and are equally-spaced in order to provide a plurality of substantially identical, helical, shock absorbing portions or spring-like elements 20 therebetween. Although subject to variation, as shown in FIG. 4, it is preferable to utilize at least three helical elements 20 in order to provide sufficient elasticity without unduly impairing the strength or torque-transmitting ability of the member. It is noted that the helical elements are of much greater width than the slots and are relatively thick to ensure adequate strength.

The end portions of the member 13 are of reduced diameter to provide external, radial shoulders 21 at the ends of the major section 19 of said member. A complementary sheath or sleeve 22 slidably and rotatably surrounds the major section of the member so as to overlie and shield the helical slots 18 and elements 20 and thereby prevent the possible hanging thereof on obstructions. The sleeve 22 is of greater length than the section 19 of the member so as to extend above and below the shoulders 21. A hardened wear ring 23, having a press fit on each end portion of the member 13, abuts each shoulder. The sleeve is supported by a flanged bushing or collar 24 which is screwthreaded in its upper end and rests on the upper wear ring 23. An internal stop collar or ring 25 is secured within the lower end of the sleeve 22 to limit upward movement of said sleeve relative to the member and is spaced below the lower wear ring to permit limited longitudinal expansion or extension of the section 19 of said member (FIG. 3). The bushing 24 and stop ring 25 are slidable on the end portions of the member to permit upward and downward movement of said member relative to the sleeve.

A complementary cylindrical sleeve or tube 26, of rubber or other suitable elastic material, is disposed within the bore 14 of the member 13 and extends above and below the major intermediate section 19 of said member so as to underlie the helical slots 18 and elements 20 thereof. In order to ensure sealing of the slots, the sleeve 26 has a plurality of helical ribs 27 complementary to said slots and filling the major portions thereof. The sleeve and its ribs 27 are bonded to the member so as to prevent displacement of said sleeve whereby said sleeve functions as a liner and does not interfere with the flow of drilling fluid from the drill stem to the drill bit. It is noted that the ribs of the sleeve are of less radial thickness or depth than the slots so as to terminate short of the outer portions of said slots and permit outward distortion of said ribs upon longitudinal contraction of the major section of the member which tends to close said slots (FIG. 3). In addition to sealing the slots 18, the ribs 27 coact with the spring-like elements 20 to cushion the contraction thereof and, with the sleeve 26, resists excessive longitudinal expansion or extension of the section 19 of the member 13. Also, the sleeve and its ribs function to secure the elements to one another and provide a unitary structure.

The helical, spring-like elements 20 are of sufficient strength and rigidity to transmit torque from the drill stem 10 to the drill bit 11. The shocks generated by the drill bit contacting the formation are absorbed by the resiliency of the elements which permits longitudinal contraction of the major section 19 of the member 13. This contraction is cushioned by the elastic sleeve 26 and particularly by its ribs 27 being disposed in the slots 18 so as to limit closing movement of said slots. It is noted that a plurality of the elements 20 is preferred since a positive connection remains in the event of the accidental breakage of one of said elements. Also, the plurality of elements makes possible sufficient resiliency without sacrificing strength. The outer sleeve 22 prevents the catching or hanging of the elements on obstructions in the well bore and, in coaction with the elastic sleeve, confines the elements against lateral displacement in the event of breakage. Due to its slidable and rotatable mounting, the outer sleeve does not interfere with relative movement of the member upon longitudinal contraction and expansion of its major section. Of course, the outer sleeve prevents separation of the shock absorber 12 in the event of breakage of the elements 20 since the member 13 of said shock absorber is confined between the bushing 24 and stop ring 25.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A shock absorber for a drill string having a drill bit at its lower end including a cylindrical body adapted to be mounted in the drill string adjacent the drill bit, the body having a bore extending therethrough for conducting drilling fluid to the bit, said body having at least one helical slot to provide at least one helical shock absorbing portion, a sleeve of elastic material complementary to and secured within the bore of said body for sealing the slot thereof, at least one helical rib on the exterior of the elastic sleeve and substantially complementary to said slot for engaging therein to cushion the contraction of the helical shock absorbing portion of said body, and a sleeve slidably confined on said body in overlying relation to its helical shock absorbing portion to shield said portion and the slot thereof.

2. A shock absorber as set forth in claim 1, wherein the helical rib of the elastic sleeve is of less radial depth than the helical slot of the body so as to terminate inwardly of the exterior of said body.

3. A shock absorber as set forth in claim 1 wherein the elastic sleeve extends above and below the upper and lower ends of the slot of the body, said sleeve and its rib being bonded to said body.

4. A shock absorber as set forth in claim 1 wherein the body has a plurality of helical slots of equal width and spacing to provide a plurality of helical shock absorbing portions of equal width and spacing, the elastic sleeve having a plurality of external ribs substantially complementary to the helical slots of said body.

5. A shock absorber as set forth in claim 4 wherein the helical ribs of the elastic body are of less radial depth than the helical slots of the body so as to terminate inwardly of the exterior of said body, said elastic sleeve extending above and below the upper and lower ends of said slots, said sleeve and its ribs being bonded to said body.

6. A shock absorber for a drill string having a drill bit at its lower end including a cylindrical body adapted to be mounted in the drill string adjacent the drill bit, the body having a bore extending therethrough for conducting drilling fluid to the bit, said body having at least one helical slot to provide at least one helical shock absorbing portion, a sleeve of elastic material complementary to and secured within the bore of said body for sealing the slot thereof, at least one helical rib on the exterior of the elastic sleeve and substantially complementary to said slot for engaging therein to cushion the contraction of the helical shock absorbing portion of said body, the rib being of less radial depth than said slot so as to terminate inwardly of the exterior of said body.

7. A shock absorber as set forth in claim 6 wherein the elastic sleeve extends above and below the upper and lower ends of the slot of the body, said sleeve and its rib being bonded to said body.

8. A shock absorber for a drill string having a drill bit at its lower end including a cylindrical body adapted to be mounted in the drill string adjacent the drill bit, the body having a bore extending therethrough for conducting drilling fluid to the bit, said body having a plurality of helical slots of equal width and spacing to provide a plurality of helical shock absorbing portions of equal width and spacing, a sleeve of elastic material complementary to and secured within the bore of said body for sealing the helical slots thereof, and a plurality of helical ribs on the exterior of the elastic sleeve and substantially complementary to said slots for engaging therein to cushion the contraction of the helical shock absorbing portions of said body, the ribs being of less radial depth than said slots so as to terminate inwardly of the exterior of said body.

References Cited in the file of this patent
UNITED STATES PATENTS

| | | |
|---|---|---|
| 2,325,811 | Ferrel | Aug. 3, 1943 |
| 2,388,741 | Hays | Nov. 13, 1945 |
| 2,536,216 | Powell | Jan. 2, 1951 |
| 2,953,351 | Bodine et al. | Sept. 20, 1960 |